Jan. 19, 1932.     F. J. VLCHEK     1,841,688
TOOL
Filed July 7, 1930
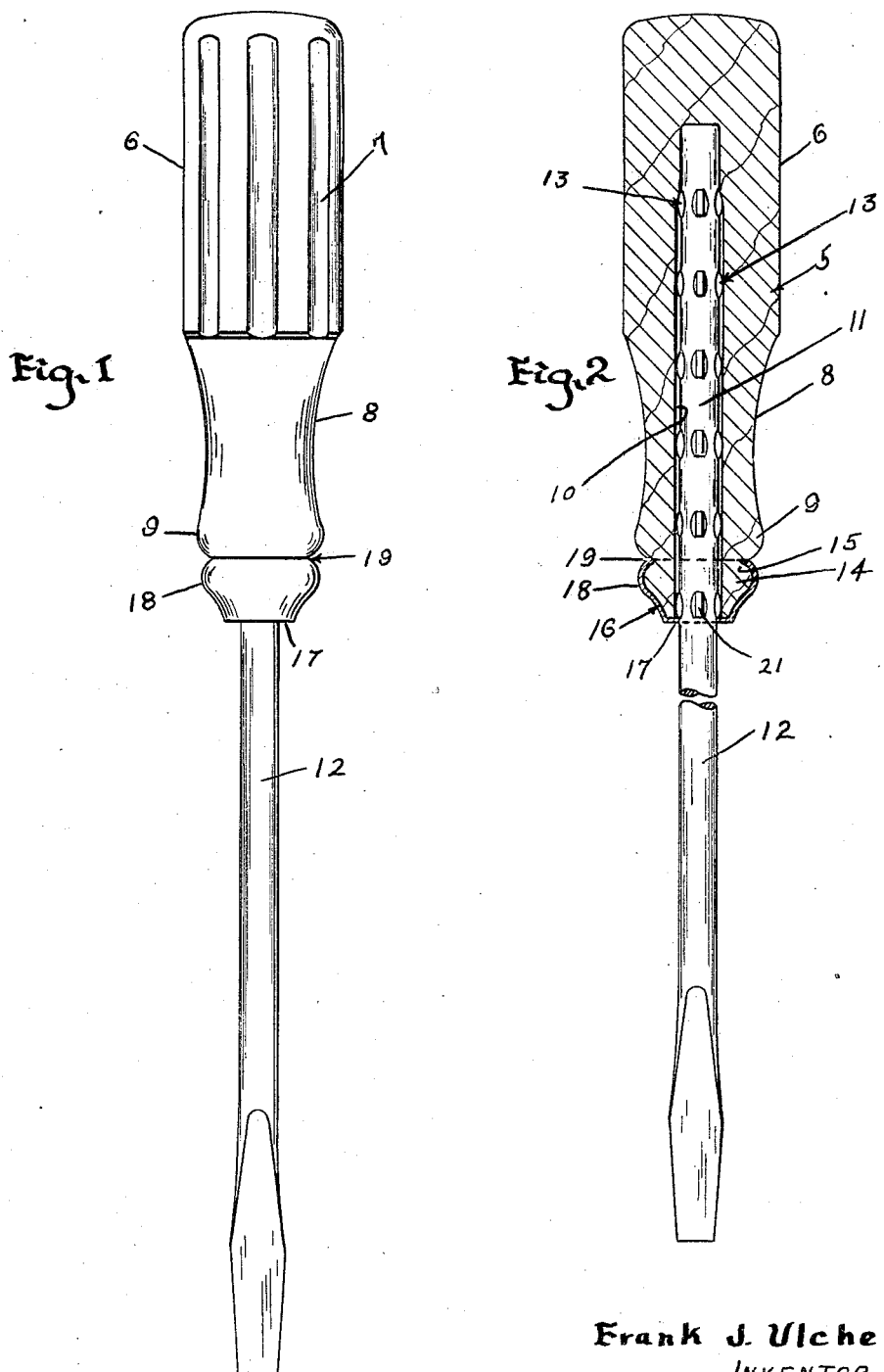
Frank J. Vlchek
INVENTOR
By Smith and Freeman
ATTORNEYS Patented Jan. 19, 1932

1,841,688

UNITED STATES PATENT OFFICE

FRANK J. VLCHEK, OF CLEVELAND, OHIO, ASSIGNOR TO THE VLCHEK TOOL COMPANY, OF CLEVELAND, OHIO, A CORPORATION OF OHIO

TOOL

Application filed July 7, 1930. Serial No. 465,853.

This invention relates to tools, and has for its principal object the provision of an improved tool and method of making the same. In the drawings accompanying this specification and forming a part of this application I have shown, for purposes of illustration, one form which my invention may assume, and in the drawings:

Figure 1 of the drawings shows an elevational view of an embodiment of the tool, while Figure 2 shows a longitudinal sectional view of said embodiment.

The embodiment of the invention herein shown comprises a handle 5, as of wood, having a butt end 6 provided with longitudinally extending grooves 7, a reduced portion 8, a finger rest 9, and a socket 10, adapted for the reception of the shank 11 of the tool blade 12. The shank 11 is provided with a plurality of laterally extending projections 13 and is adapted to be driven into the socket 10 so that the projections 13 become somewhat embedded in the adjacent wall of the socket 10.

The handle 5 below the finger rest 9 is further provided with a laterally enlarged section 14 of relatively heavy cross-section, but shallow in depth, tapering toward the end of the handle, and reduced behind as indicated at 15.

Seated about the enlarged section 14 is a ferrule 16, preferably of metal, shallow in depth to correspond to the enlarged section 14, comprising a bottom wall 17 through which the shank 11 of the blade 12 extends, having a side wall 18 fitting snugly about the enlarged section 14, and having its edge 19 contoured behind the reduced portion 15 of the enlarged section 14, as by spinning, thereby firmly anchoring the ferrule 16 permanently in position with respect to the enlarged section 14, with the wall 17 of said ferrule 16 abutting the lower surfaces of the projections 21 on the shank 11.

The handle 5 is made of such length that the palm of the hand of the user may engage the butt portion 6, while the fingers engage the reduced portion 8 of the handle, reaching only far enough to bear against the finger rest 9, so that they never come into contact with the ferrule 16, as in ordinary constructions, where the fingers are likely to slip off of the tool.

By provision of the construction described an especially strong tool is produced; the ferrule is permanently clamped to a heavy cross-sectional body of the handle, and due to the heavy cross-sectional extent of the enlargement 14, there is practically no danger of the handle splitting at this point as so frequently occurs in tools of ordinary construction, and the ferrule cannot become accidentally detached.

My method of producing a tool of the character described, comprises forming a socketed handle of a character similar to the handle 5, and forming said handle 5 with the lateral enlargement 14 of heavy cross-section, but of substantially shallow depth longitudinally of the tool. After the handle is so formed the shank 11 is driven into the socket 10 and by reason of the heavy cross-sectional area of the lateral enlargement 14, there is very little danger of splitting during this operation, such as occurs in ordinary constructions.

The ferrule 16 is produced, and due to its shallow formation, such as will fit the shallow enlargement 14, may be drawn from a suitable plate of metal in a single drawing operation, as compared with a plurality of expensive annealing and drawing operations which are necessary in providing the deep ferrules ordinarily used. The ferrule 16 is then pierced, and disposed about the blade 12, fitted about the enlarged section 14, after which the edge portion 19 of the ferrule 16 is contoured behind the reduced portion 15, of the enlarged section 14, as by spinning, permanently clamping the same to the handle and also anchoring the blade 12 to the handle.

An important feature of the method described resides in providing the shallow enlarged section 14, of heavy cross-section, forming the ferrule 16 of correspondingly shallow depth, such as to enable it to be formed in a single drawing operation without annealing, and subsequently permanently securing the ferrule as by spinning the edges behind the reduced portion of the enlarged section. By this method a number of expensive operations incident to the production of ordinary tools, and to the application of the ferrules thereto, such as a plurality of drawing, shaping, and annealing operations, are entirely eliminated, while at the same time a greatly strengthened construction, not subject to splitting either when the shank is driven into the socket, or afterwards, is produced.

Under the circumstances it will be apparent to those skilled in the art that I have accomplished at least the principal object of my invention; at the same time it will be apparent that the embodiments of the invention are capable of other uses than those herein pointed out as well as embodying advantages other than those referred to herein. It will also be observed that the embodiments of the invention herein shown and described may be variously changed and modified without departing from the spirit of the invention; accordingly it will be appreciated that the embodiments herein disclosed are illustrative only, and that my invention is not limited thereto.

I claim:

1. A tool comprising a socketed handle having a laterally enlarged section at least partly surrounding the mouth of the socket in said handle, a tool blade having a shank disposed in said socket and provided with a lateral projection, and a ferrule, through which said shank extends, clamped about the enlarged section of said handle, and bearing exteriorly against the lateral projection of said shank.

2. A tool comprising a socketed handle having a laterally enlarged section at least partially surrounding the mouth of the socket in said handle; a tool blade having a shank disposed in said socket and provided with a shoulder; and a ferrule through which said shank extends, secured about the enlarged section of said handle, extending continuously about the end of said handle and embracing said shoulder in interlocking engagement therewith.

3. A tool comprising a socketed handle having a laterally enlarged section of shallow depth longitudinally of said tool, but of heavy cross-section, at least partly surrounding the mouth of the socket in said handle; a tool blade having a shank disposed in said socket; and a ferrule through which said shank extends, secured about the enlarged section of said handle, extending continuously about the end of said handle; said shank having means for interlocking engagement with said ferrule.

4. A tool comprising a socketed handle having a laterally enlarged section of shallow depth longitudinally of said tool, but of heavy cross-section, at least partly surrounding the mouth of the socket in said handle; a tool blade having a shank disposed in said socket; and a ferrule through which said shank extends, contoured to clamp about and behind the enlarged section to provide a secure anchorage therefor; said ferrule extending continuously about the end of said handle; said shank having means for interlocking engagement with said ferrule.

5. A tool comprising a socketed handle having a laterally enlarged section at least partly surrounding the mouth of the socket in said handle; a finger rest spaced from said enlargement toward the opposite end of said handle; a tool blade having a shank disposed in said socket; and a ferrule through which said shank extends, secured about the enlarged section of said handle, contoured to fit about and behind the enlarged section of said handle and having its terminal end extending between said enlarged section and said finger rest; said shank having means for interlocking engagement with said ferrule.

6. A method of making tools having a handle and shank, comprising: forming a socketed handle with a laterally enlarged section of relatively shallow depth longitudinally of said tool, but of heavy cross-section, at least partly surrounding the socket mouth; forming a shallow ferrule in a single drawing operation to correspond to the shallow depth of said enlarged section; fitting said ferrule about said enlarged section in position to surround said shank; contouring said ferrule behind said enlarged section to permanently anchor the ferrule in position; and interlocking said ferrule with said shank.

7. A method of making tools having a handle and shank, comprising: forming a socketed handle with a laterally enlarged section of relatively shallow depth longitudinally of said tool, but of heavy cross-section, at least partly surrounding the socket mouth; forming a shallow ferrule in a single drawing operation to correspond to the shallow depth of said enlarged section; piercing said ferrule by extending said shank therethrough; fitting said ferrule about said enlarged section in position to surround and hold said shank; and contouring said ferrule behind said enlarged section to permanently anchor the ferrule in position; and interlocking said ferrule with said shank.

8. A tool comprising a handle having a longitudinally extending socket and an enlarged section at least partly surrounding the mouth of said socket; a tool blade having a shank disposed in said socket; and a ferrule through which said shank extends, secured about the enlarged section of said handle with a portion thereof extending behind said enlarged section and with another portion thereof embracing the adjacent end of said handle and disposed in contact with said shank to brace said tool blade against lateral movement in said socket.

9. A tool comprising a handle having a longitudinally extending socket and an enlarged section of shallow depth longitudinally of said tool but of heavy cross-section, at least partly surrounding the mouth of said socket; a tool blade having a shank disposed in said socket; and a ferrule through which said shank extends, secured about the enlarged section of said handle with a portion thereof extending behind said enlarged section and with another portion thereof embracing the adjacent end of said handle and disposed in contact with said shank to brace said tool blade against lateral movement in said socket.

10. A tool comprising a handle having a longitudinally extending socket and an enlarged section of shallow depth longitudinally of said tool but of heavy cross-section, at least partly surrounding the mouth of said socket; a tool blade having a shank disposed in said socket; and a ferrule through which said shank extends, contoured to clamp about and behind the enlarged section to provide a secure anchorage therefor, and about the adjacent end of said handle in contact with said shank to brace said tool blade against lateral movement in said socket.

11. A tool comprising a handle having a longitudinally extending socket and an enlarged section at least partly surrounding the mouth of said socket; a finger rest spaced from said enlargement toward the opposite end of said handle; a tool blade having a shank disposed in said socket; and a ferrule through which said shank extends, secured about the enlarged section of said handle, contoured to fit about and behind the enlarged section of said handle and having its terminal end extending between said enlarged section and said finger rest, said ferrule being also contoured to embrace the adjacent end of said handle in contact with said shank to brace said tool blade against lateral movement in said socket.

In testimony whereof I hereunto affix my signature.

FRANK J. VLCHEK.